United States Patent [19]

Kim

[11] Patent Number: 5,041,247

[45] Date of Patent: Aug. 20, 1991

[54] METHOD AND APPARATUS FOR BLOW MOLDING PARTS WITH SMOOTH SURFACES

[75] Inventor: Bang M. Kim, Schenectady, N.Y.

[73] Assignee: General Electric Company, Schenectady, N.Y.

[21] Appl. No.: 435,640

[22] Filed: Nov. 13, 1989

Related U.S. Application Data

[63] Continuation of Ser. No. 250,806, Sep. 29, 1988, abandoned.

[51] Int. Cl.$^5$ .............. B29C 49/04; B28B 7/34
[52] U.S. Cl. .................... 264/37; 249/114.1; 249/116; 249/135; 264/540; 264/DIG. 69; 425/526; 425/527; 425/535
[58] Field of Search .......... 425/526, 527, 541, 215, 425/217, 535; 264/520, 523, 528, 540, DIG. 69, 37, 521; 100/297; 249/134, 135, 114.1, 112, 111, 116, 113

[56] References Cited

U.S. PATENT DOCUMENTS

| | | | |
|---|---|---|---|
| 3,185,432 | 5/1965 | Hager, Jr. .................... | 249/116 |
| 3,804,362 | 4/1974 | Stromblad et al. ......... | 425/DIG. 13 |
| 3,953,921 | 5/1976 | Estrada et al. ............. | 29/596 |
| 3,968,296 | 7/1976 | Nopper et al. .............. | 100/297 |
| 3,969,051 | 7/1976 | Hovila ......................... | 425/384 |
| 3,983,293 | 9/1976 | Ohuchi et al. ............... | 249/114.1 |
| 4,018,552 | 4/1977 | Prast et al. .................. | 425/407 |
| 4,225,109 | 9/1980 | Yotsutsuji et al. ........... | 249/111 |
| 4,432,719 | 2/1984 | Hafele .......................... | 425/526 |
| 4,563,145 | 1/1986 | de Meij ........................ | 425/407 |
| 4,581,804 | 4/1986 | McLaughlin .................. | 29/235 |
| 4,629,650 | 12/1986 | Kataoka ....................... | 425/96 |
| 4,659,304 | 4/1987 | Day ............................. | 425/DIG. 13 |
| 4,708,626 | 11/1987 | Sakai et al. .................. | 425/398 |
| 4,744,849 | 5/1988 | Michaud-Soret .............. | 249/111 |
| 4,749,399 | 6/1988 | Yamada et al. ............... | 65/273 |

FOREIGN PATENT DOCUMENTS

| | | | |
|---|---|---|---|
| 2519992 | 11/1975 | Fed. Rep. of Germany ...... | 425/143 |
| 2319477 | 2/1977 | France .......................... | 249/135 |
| 53-86754 | 7/1978 | Japan . | |
| 57-20328 | 2/1982 | Japan ........................... | 425/526 |

Primary Examiner—Jan H. Silbaugh
Assistant Examiner—Mathieu Vargot
Attorney, Agent, or Firm—Patrick R. Scanlon; James C. Davis, Jr.; Paul R. Webb, II

[57] ABSTRACT

A multilayer mold for use in blow molding parts within short cycle times is provided. The multilayer mold has a hard skin layer, an insulating layer and a base containing cooling means. The transient temperature increase of the skin layer of the mold as a hot parison contacts the mold is used to produce smooth surfaces on parts since the skin layer remains hot during parison inflation.

4 Claims, 6 Drawing Sheets

METHOD AND APPARATUS FOR BLOW MOLDING PARTS WITH SMOOTH SURFACES

CROSS REFERENCE TO RELATED APPLICATIONS

This application is a continuation of application Ser. No. 250,806, filed 9/29/88, now abandoned and is related to my copending application entitled, "Multilayer Composite Mold Structure for Molding on Hot Surfaces", Ser. No. 175,078, filed Mar. 30, 1988, also abandoned, and assigned to the same assignee as the present invention.

BACKGROUND OF THE INVENTION

The present invention relates to blow molding, pressure forming, and more particularly to apparatus for blow molding and pressure forming parts with smooth surfaces within a short cycle time.

Blow molding is a plastic forming process which produces hollow parts. The process involves the extrusion of a molten tube of resin called a parison, into a mold. The mold closes around the parison, pinching the bottom of the parison closed, air or another gas is introduced causing the tube to expand against the cool surfaces of the mold. When the parison comes in contact with the cool surface of the mold, the plastic at the surface quickly freezes. This creates surface imperfections such as die lines, fold lines, pores and voids.

One important requisite for the use of blow molded parts for exterior applications such as automotive body panels or doors, is that the surface be smooth and blemish free. The parts should be as smooth as parts currently made from sheet metal. In order to use conventionally made blow molded parts for such applications, labor intensive sanding and polishing operations are necessary.

An approach to improve the surface quality of blow molded parts is to thermally cycle a low thermal mass mold using hot and cold oils which flow in oil passages in the mold. This approach requires complex process control and adds an additional minute to cycle time. Large capital costs are involved for the equipment including a complex mold structure. Pressure forming is the forming of plastic sheets into parts through the use of vacuum on one side of the heated sheet and atmospheric or greater air pressure on the other side of the heated sheet. Contact between a heated sheet and a cool mold causes surface porosity or voids and portions of the mold are not completely filled with resin.

It is an object of the present invention to provide apparatus to blow mold parts on hot mold surfaces in a short cycle time.

It is another object of the present invention to provide apparatus to blow mold parts with smooth surfaces which can use existing equipment without major modifications.

SUMMARY OF THE INVENTION

In one aspect of the present invention a mold for use in blow molding a heated parison into a finished part is provided. The mold has a base portion with the surface having the general contour of the part to be molded, the base includes cooling means for removing heat from the parison. An insulating layer is attached to at least a portion of the contoured surface of the base for slowing the cooling of the parison during molding. A skin layer with a thermal conductivity greater than that of the insulating layer and having the contour and surface characteristics to be imparted to the finished part is affixed to the insulating layer.

BRIEF DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in conjunction with the accompanying drawing FIGURES in which:

FIG. 7A and 7B are graphs on a common distance scale showing the surface roughness of a blow molded part formed by contact with a conventional mold and a modified multilayer portion of the same mold, respectively;

FIG. 8 is a graph showing the surface roughness of a blow molded part formed by contact with a multilayer mold in accordance with the present invention; and FIG. 9 is a cutaway side view of apparatus used for pressure forming heated plastic sheet in accordance with the present invention.

DETAILED DESCRIPTION OF THE INVENTION

Figure 1:
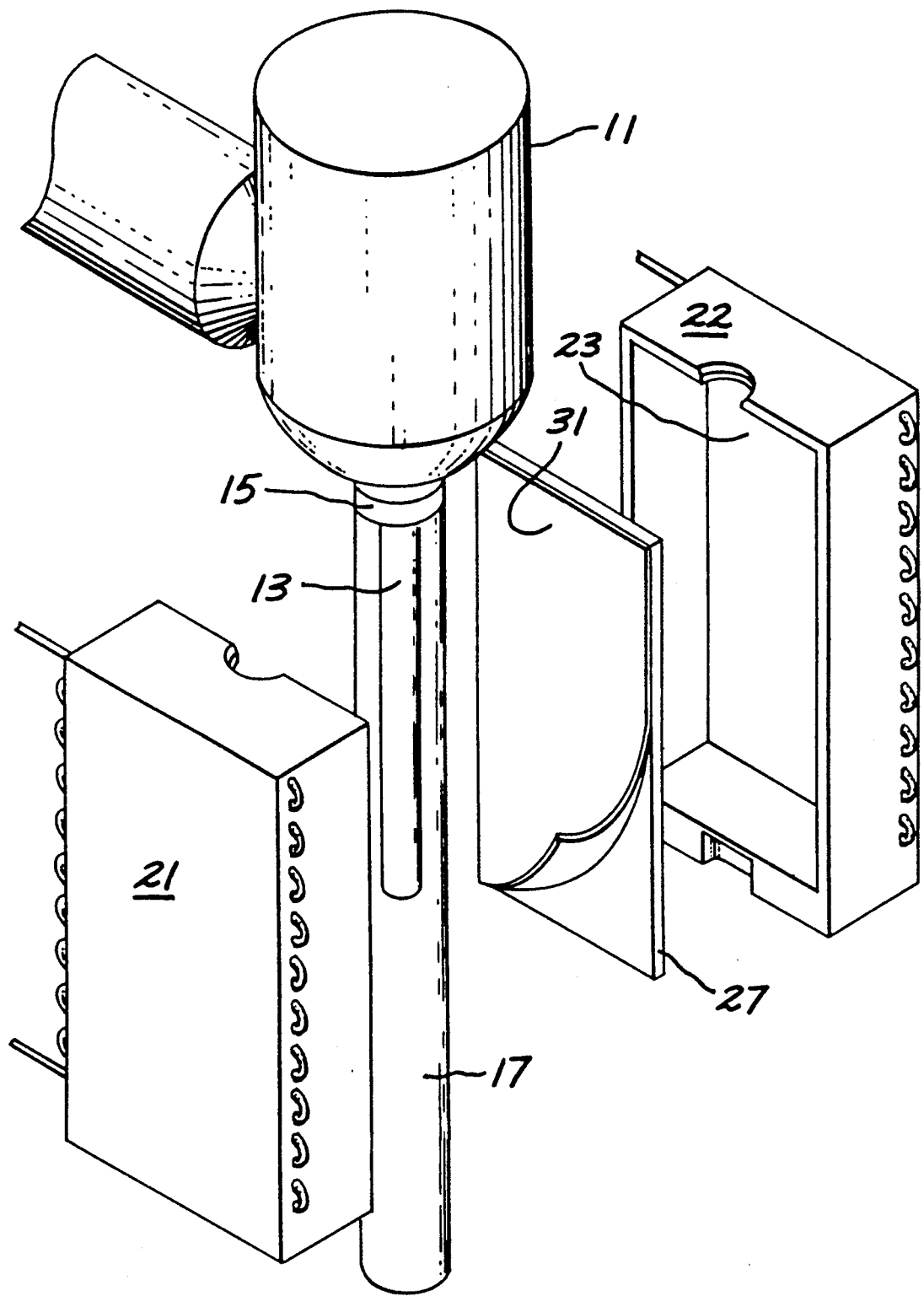
FIG. 1 is a partially exploded isometric view showing a die head extruding a parison between mold halves having a multilayer structure, in accordance with the present invention.

Referring now to the drawing and more particularly FIG. 1 thereof, a die head 11 having a centrally located downwardly extending blow pin 13 is shown. Molten thermoplastic is extruded from a circular shaped die 15 surrounding and spaced away from the blow pin 13 in the die head 11. The extruded hollow tube 17 of molten thermoplastic, called a parison, extends vertically downward between two mold halves 21 and 22.

Figure 2:
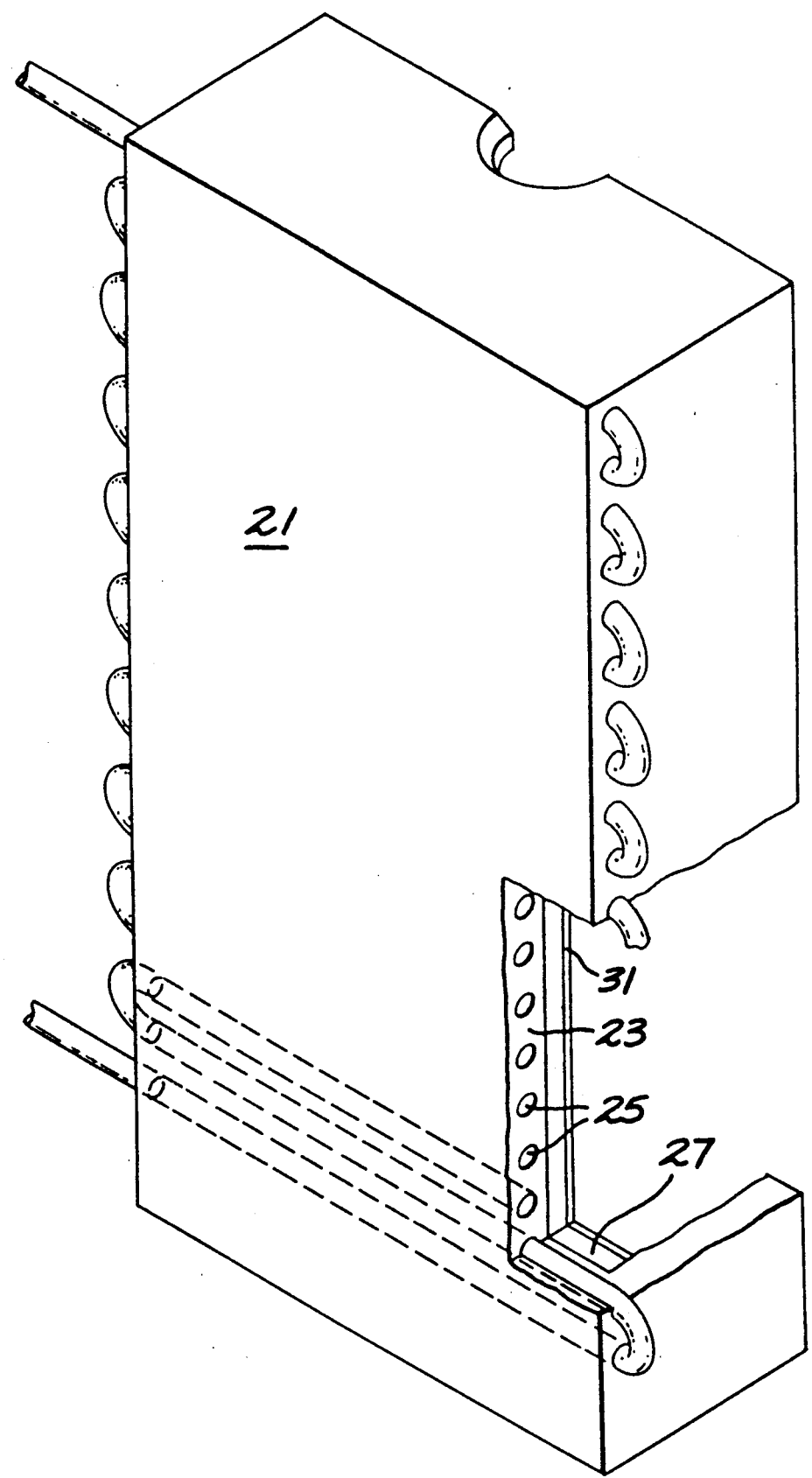
FIG. 2 is an isometric view with a partial cutaway of a multilayer mold half from FIG. 1.

Referring now to FIGS. 1 and 2, the mold halves 21 and 22 in accordance with the present invention have a multilayer construction. A base layer 23 of the mold can comprise an already existing blow mold having cooling passageways 25. An insulation layer 27 is affixed to at least a portion of the base layer 23 such as by adhesive bonding and a skin layer 31 with a thermal conductivity greater than the insulating layer is affixed to the insulating layer such as by adhesive bonding using for example room temperature vulcanizing rubber, epoxy or double sided tape. The base, insulation layer, and skin layer have the contour of the finished part to be formed. The surface of the skin layer facing the mold interior has the same surface finish as desired for the finished part, such as textured or smooth, as well as any desired pattern.

The hard skin layer can be fabricated from carbon steel, stainless steel, nickel, aluminum, brass, copper, ceramics, glass, quartz, plastics, and plastic composites. Metal alloys with a low thermal expansion coefficient, such as Invar ferronickel, can also be used.

The insulating layer can be fabricated from porous metals, plastics, plastic composites, expanded composites, and elastomers. The insulating layer can alternatively be fabricated from a compressible material such as a felt of thermally stable fibers. Suitable thermally stable fibers are ceramic, metal, glass, and polymers. The compressibility of the felt is desirable because of the differences in thermal conductivity in the compressed and uncompressed state. During operation the insulation layer will be subjected to 25-500 psi when the parison is inflated. Initial contact of the parison with the skin layer can occur with the insulation uncompressed allowing more of the heat transferred from the hot parison to be retained. After inflation of the parison the insulation is compressed promoting parison cooling.

The skin and insulation layer can alternatively comprise a single material with different thermal conductivities due to structural differences achieved during fabrication. Using vapor deposition, metal spraying or electroplating, for example, a dense layer can be created against a form of the desired part for the skin layer while a superimposed porous region can be created to function as the insulation layer.

The skin layer should have a thermal conductivity in the range of $1 \times 10^{-2}$ to $1 \times 10^{-1}$ cal/cm$^2$ sec. C/cm and a thickness of 0.0025-0.05 cm (1 mil to 20 mils). The symbol C represents temperature in centigrade. The insulating layer should have a thermal conductivity of $5 \times 10^{-3}$ to $1 \times 10^{-4}$ cal/cm2 sec. C/cm. When a compressible insulation layer is used, the uncompressed insulation layer (prior to parison inflation) should be in the aforementioned range. The thickness depends on the thermal diffusivity $\alpha$ of the material which has units of cm$^2$/sec. Thermal diffusivity is defined by the following equation:

$$\alpha = \frac{k}{c\rho} \quad (1)$$

where k is the thermal conductivity, c the density and $\rho$ the specific heat, all expressed in CGS units. The thickness of the material in centimeters has a range represented by equation 2.

$$0.5\sqrt{\alpha} < \text{thickness} < 10\sqrt{\alpha} \quad (2)$$

With the lower end of the range the minimum thickness required to allow the parison to reheat the skin layer to above the glass transition temperature after an initial quench. Greater thicknesses maintain the temperature longer but require longer cooling times.

The base of the multilayer mold should preferably have a thickness of 0.5 cm-5 cm (0.2 in. -2 in.) between the insulating layer and the cooling fluids and a range of conductivities the same as the skin layer $1 \times 10^{-2}$-$1 \times 10^{-1}$ cal/cm$^2$ sec. C/cm.

The portion of the base to be covered by an insulation layer and a skin layer is determined by the type and location of the desired finish on the blow molded part.

Although the sequence of the material layers (thin hard skin layer, an insulating layer, and mold) is the same as in the multilayer mold structure used in my copending application entitled "Multilayer Composite Mold Structure for Molding on Hot Surfaces" for compression molding composite materials, the materials and dimensions for blow molding neat resins are different from those used in compression molding. One reason for the difference is due to the very different conditions employed by the two processes. Firstly, blow molding is done at lower pressures, i.e., 50-250 psi as compared to 1000-4000 psi with compression molding. Secondly, the temperature of the resin melt is much lower in the case of blow molding. This is because the parison should have a high melt strength in the case of blow molding so that the parison retains its shape prior to molding, whereas in compression molding the resin should be less viscous to allow the resin to flow. Thus, the materials choice for blow molding is less restricted. The cost of making a mold for blow molding will be less than that of a compression mold.

During the molding process the mold halves 21 and 22 close around the parison 17 pinching the lower end of the parison. The parison is inflated using the blow pin 13 and forced against the interior walls of the mold. The parison surface is quenched by the cool skin of the multilayer mold surface and reheated by the parison. For proper operation the cool skin surface is reheated to a temperature higher than the glass transition temperature of the plastic of the parison and the resin fills the mold surface and duplicates the mold surface structure.

The transient thermal response of a parison outer surface during molding was calculated for a multilayer mold of the type shown in FIGS. 1 and 2 and a conventional mold. The parison was assumed to be a polycarbonate such as Lexan ® 141 polycarbonate, ⅛ inch thick and extruded at 450° F. The mold was assumed to be fabricated from stainless steel 420. The multilayer mold included a 1/64th inch thick skin layer of stainless steel 420 and a 1/16 inch insulating layer comprising a composite of 40% glass fibers in a matrix comprising a blend of bisphenol A polycarbonate and polybutylene terephalate such as Xenoy ® thermoplastic. Xenoy and Lexan are registered trademarks of the General Electric Company. The mold is assumed to be cooled at 225° at a distance of ⅛ inch from the mold surface.

The physical properties of the materials used in the calculations for the graphs are shown in the table below:

| | Thermal Conductivity (cal/cm 2 sec. C./cm) | Density (g/cc) | Specific heat (cal/g. C.) |
| --- | --- | --- | --- |
| Skin & Mold Material (Stainless Steel 420) | $5.95 \times 10^{-2}$ | 7.75 | 0.11 |
| Insulating Material (Xenoy with 40% glass) | $7.67 \times 10^{-4}$ | 1.76 | 0.262 |
| Parison (Lexan 141) | $4.64 \times 10^{-4}$ | 1.2 | 0.3 |

Figure 3:
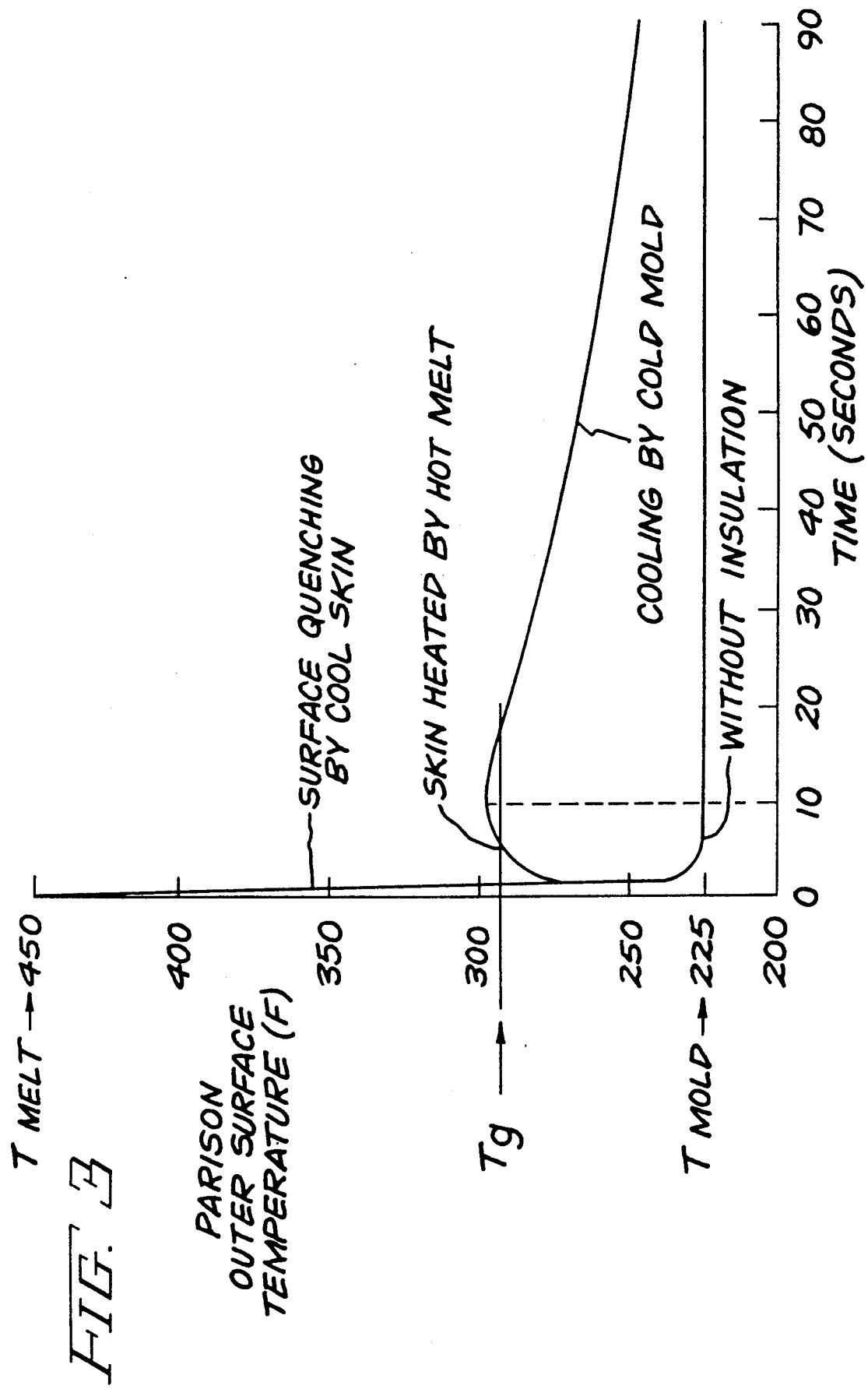
FIG. 3 is a graph showing the calculated parison outer surface temperature versus time for a mold without an insulation layer and a multilayer mold.

As can be seen in FIG. 3, without the insulation the surface temperature of the parison outer surface immediately cools down which would produce a rough surface on a blow molded part. With the insulated mold, the parison surface is quenched by the cool skin, but is reheated by the hot melt. If the temperature increase of the skin layer is higher than the glass transition temperature of the resin used in the parison, then the resin would fill the mold surface and duplicate the mold surface structure.

Figure 4:
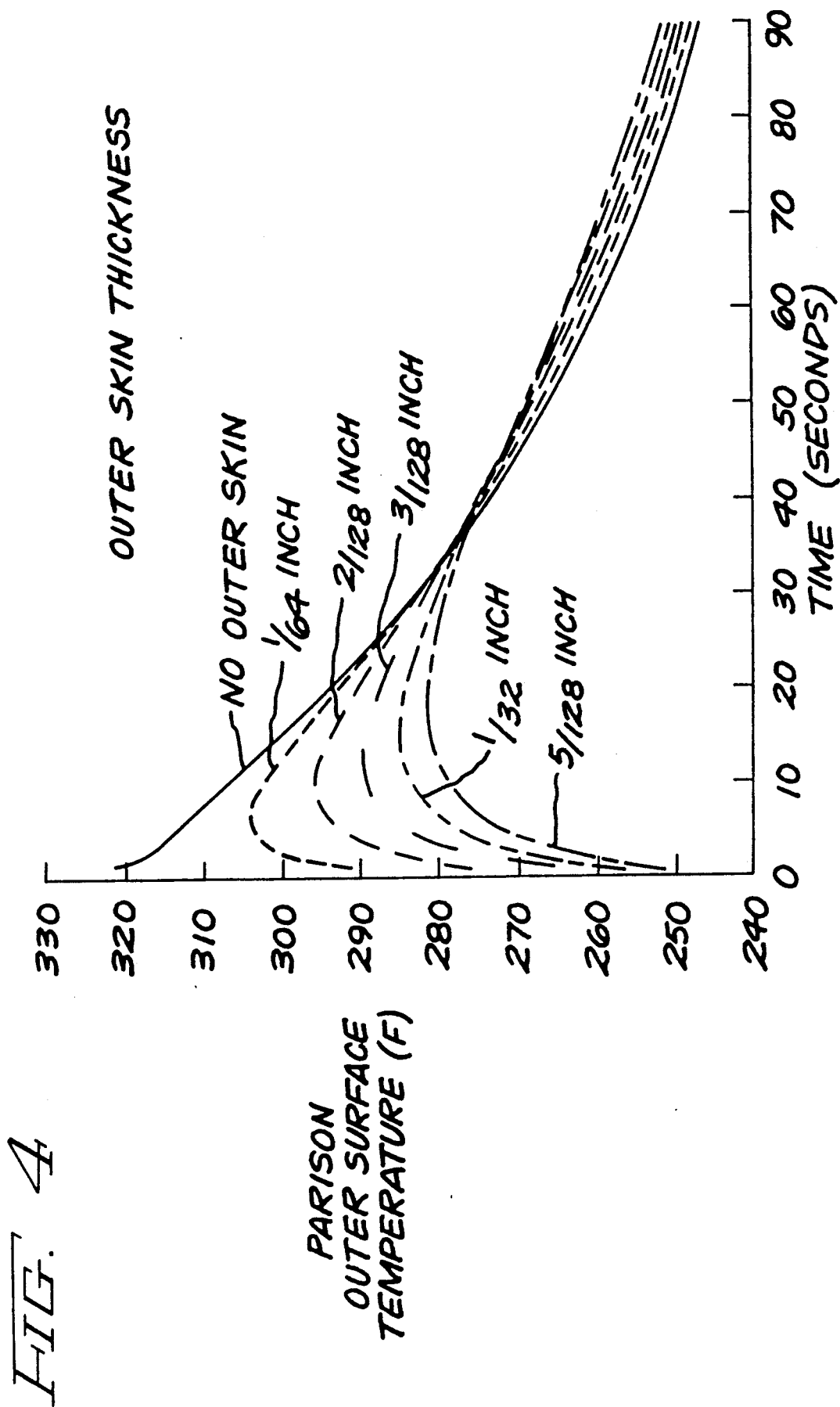
FIG. 4 is a graph showing the calculated parison outer surface temperature as a function of time for various multilayer mold skin layer thicknesses.

The effect of changing the skin thickness in the mold and the calculated effect on the parison outer surface temperature is shown in FIG. 4 for the same type mold and initial conditions used in FIG. 3. Increasing thicknesses of the outer skin layer reduce the skin temperature achieved after the initial quenching.

Figure 5:
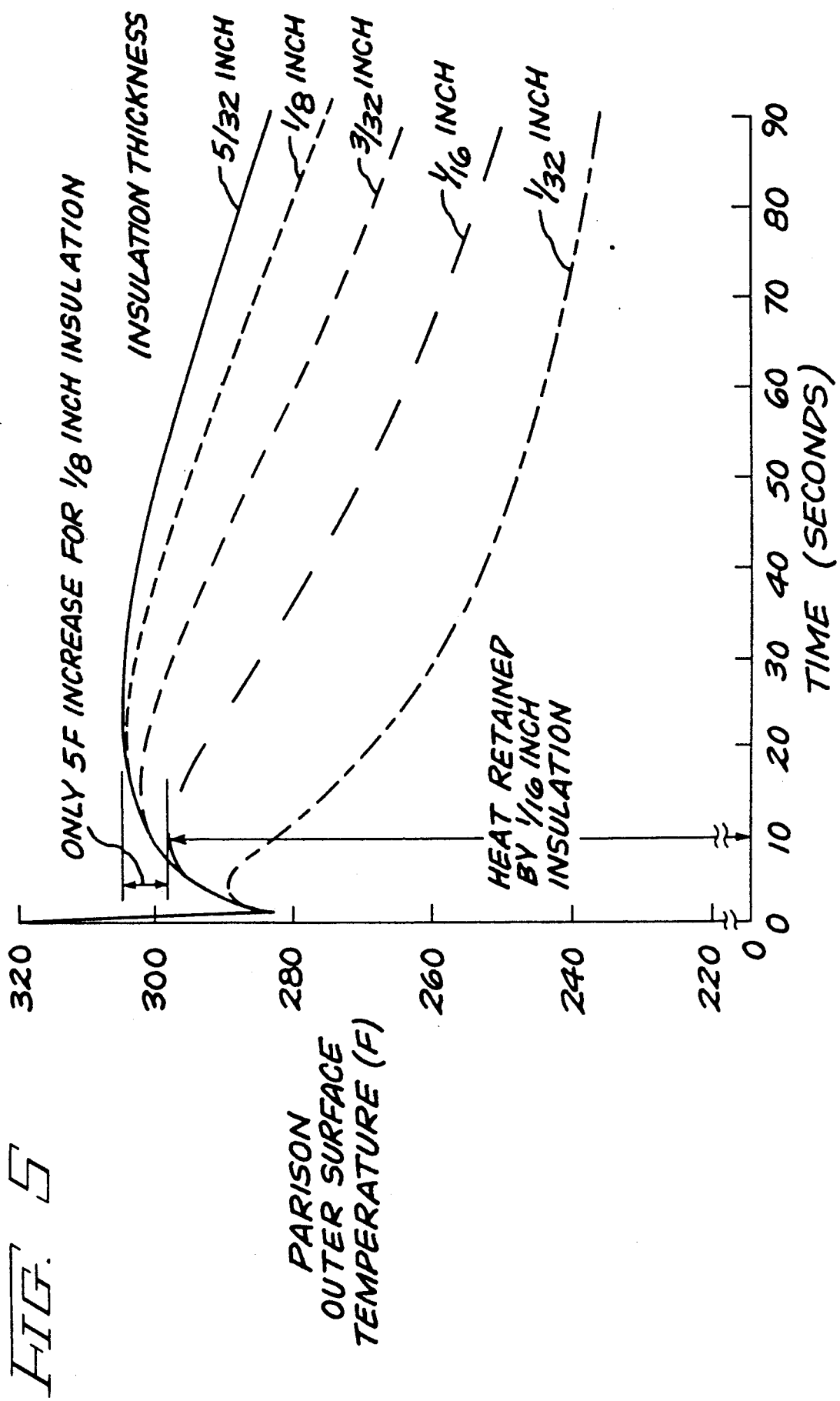
FIG. 5 is a graph showing the calculated parison outer surface temperature as a function of time for different thicknesses of insulation in a multilayer mold.
Figure 6:
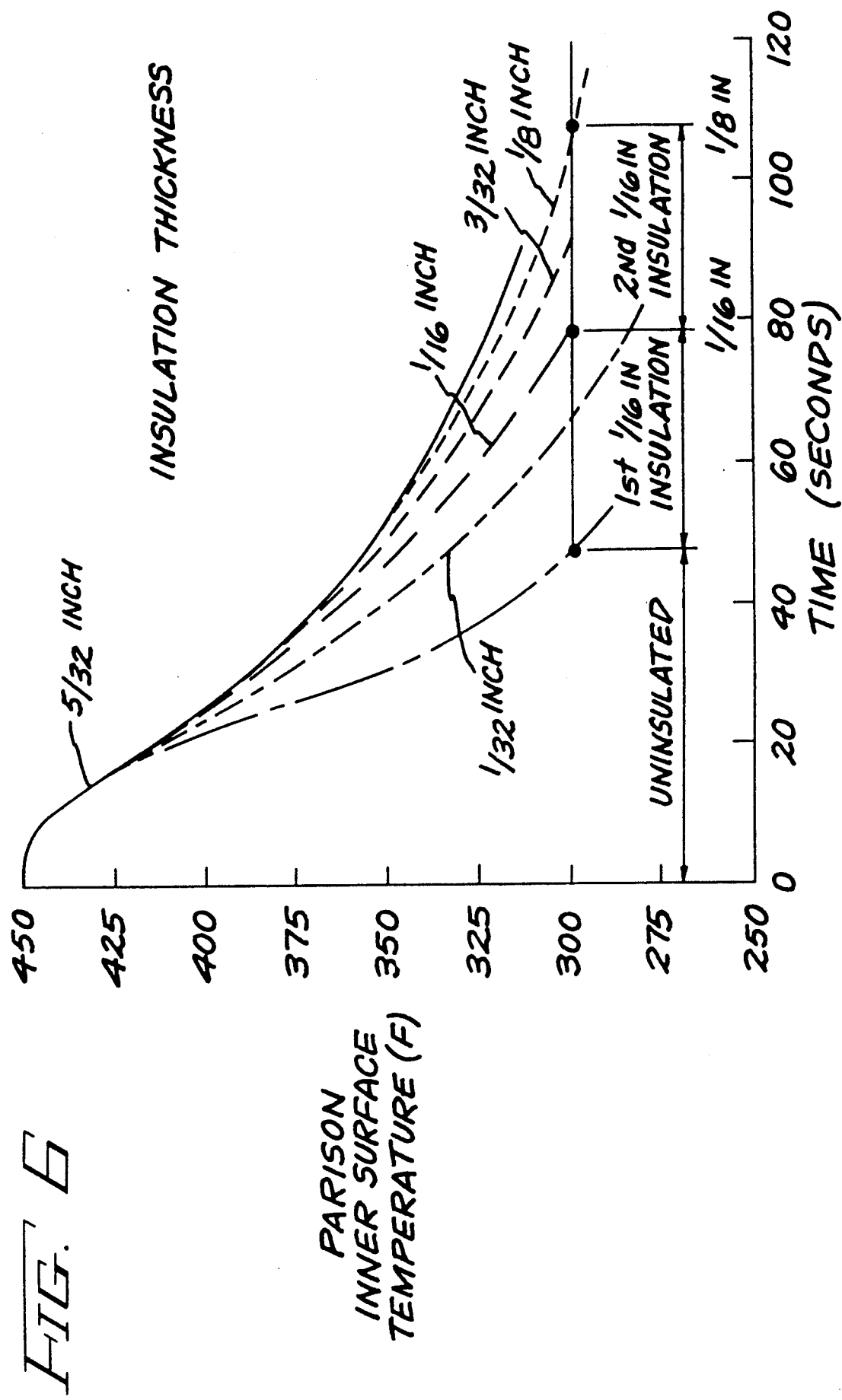
FIG. 6 is a graph showing the calculated parison inner surface temperatures as a function of time for different insulation thicknesses of the multilayer mold.

The calculated effects of changing the insulation thickness in a multilayer mold having a skin layer thickness of 1/64 of an inch is shown in FIG. 5. While increasing the insulation thickness increases the temperature of the outer parison surface, each subsequent incremental increase in thickness has less effect than the previous one. However, as shown in FIG. 6 there is an increase in cycle time caused by the slower cooling of the parison inner surface for every incremental increase in insulation thickness which does not diminish with increasing insulation thickness.

To test the thermal stability of insulating materials to be used in a multilayer mold, copper clad polyimide and an epoxy based glass fiber composite cladded with copper, both of which are used for printed circuit board manufacture, were used. While the epoxy based composite began to degrade at 450° F., the polyimide did not show any sign of deterioration at this temperature. Compression of the polyimide at 250 psi after heating to 400° F., did not cause any changes in surface characteristics.

Test panels 27.5 inches by 13.5 inches by ⅛ inches were blow molded using an ⅛ inch polyimide insulating layer and a ¼ mil skin layer made from copper clad printed circuit board. The insulating layer and skin layer were attached to approximately one half of one surface of an existing mold with double surface adhesive tape. The blow molded operation inflated a 450° F. parison of polyphenolene ether blend (Noryl BN-30) with air at 100 psi. The mold surface was 200° F. prior to contact with the parison. The surface of the resulting part molded on the multilayer mold surface was very smooth and had minimized die lines, fold lines, and porosity. The profile of the portion of the test panel in contact with the ordinary blow mold and the multilayer blow mold portion are shown in FIGS. 7A and B, respectively. The average surface roughness of a portion of the test panel in contact with the multilayer portion was 12 microinches and had a peak-to-valley height of 148 microinches. By comparison, the average surface roughness of a portion of the blow molded test panel not in contact with the multilayer portion of the mold produced an average roughness of 132 microinches and the peak-to-valley height was 2620 microinches with clearly visible die lines and fold lines.

Another test panel was blow molded using a 1/16 inch insulating layer of polyimide composite and a 1/64 inch (16 mil) skin layer of chrome plated steel which was highly polished, affixed to a portion of the interior of a conventional blow mold. The blow molded operation involved inflation of a parison of polyphenolene ether blend (Noryl BN-30) at 450° F. with air at 80 psi on a mold surface of 200° F. The surface of the molded part in contact with the multilayer portion of the mold was very smooth and minimized die lines and porosity. Most of the surfaces had a specular appearance. The surface had an average roughness of 2 microinches and a peak to valley height of 22 microinches. This surface had the lowest surface roughness I have measured on parts produced by blow molding or compression molding. The small area which did have defects had an average roughness of 18 microinches and a peak to valley height of 130 microinches.

Resins having a high glass transition temperature can be blow molded to achieve a smooth finish by using an initial "throw away" hot parison to preheat the mold surface for the next parison. Two parisons are used to produce a single part. The first parison is only to heat the mold surface. The mold is opened before the surface of the mold reaches the glass transition temperature. The parts produced by the premature cooling are ground and recycled to the extruder. While the mold surface is still hot, the next parison drops into place to produce the desired smooth surfaced part which is then allowed to fully cool before removal.

Referring now to FIG. 9, apparatus for pressure forming heated plastic sheet is shown. A plastic sheet 35 heated above its glass transition temperature is held by clamps 37 and positioned over a multilayer mold 41. The mold 41 defines cooling passageways 43 in a base portion 45. An insulating layer 47 covers and is affixed to at least a part of the base portion 45. If desired the insulation layer could cover the side walls of the base as well. A skin layer 51 having surface finish and texture of the desired finished part is affixed to the insulation layer 47. The multilayer mold material, thicknesses, thermal conductivities and mounting are the same as previously described in the multilayer mold used in blow molding. The heated sheet 35 in contact with the perimeter of the mold 41 covers the mold. The side of the sheet facing away from the mold is enclosed by a cover 53 which contacts the sheet at its perimeter. Air is evacuated from passageways 55 extending through the mold from the interior to the exterior. Gas pressure greater than atmospheric pressure can be introduced through passageway 57 in the cover. Pressures in the range utilized in blow molding can be used. The force exerted above the heated sheet forces the sheet against the mold. The skin layer is heated by contact with the sheet. The insulation layer is heated by contact with the sheet. The insulation layer delays the cooling of the skin layer allowing the skin layer to provide a hot surface, preferably above the glass transition temperature of the sheet so that the skin layer surface can be accurately reproduced. The cooled base cools the part permitting the part to withdraw from the mold.

The foregoing has described a multilayer mold for blow molding parts with smooth surfaces in short cycle time which can use existing equipment without major modifications. The multilayer mold can also be used to pressure form heated plastic sheets with smooth surfaces in short cycle times.

While the invention has been particularly shown and described with reference to several embodiments thereof, it will be understood by those skilled in the art that various changes in form and detail may be made without departing from the spirit and scope of the invention.

What is claimed is:

1. A mold for use in blow molding a heated parison into a finished part comprising:
    a base having a surface with the general contours of the part to be molded, said base including constant temperature cooling means, said base defining an aperture for surrounding a blow pin and a cut off means for pinching off the parison;
    an insulating layer attached to at least a portion of the contoured base for slowing the cooling of the parison during molding, said insulating layer comprising a compressible felt of thermally stable fibers with increased thermal conductivity when compressed; and a skin layer affixed to said insulating layer, said skin layer having a thermal conductivity greater than the insulating layer and said skin layer having the contour and surface characteristic corresponding to those desired of the finished part, said insulating layer with said skin layer affixed thereto situated in a portion of said base corresponding to the portion of the finished part where the surface characteristics of the skin layer, is desired.

2. The mold of claim 1 wherein said thermally stable fibers for said compressible felt are selected from the group consisting of ceramic, metal, glass and polymers.

3. A method of blow molding a heated parison into a finished part comprising the steps of:

providing a mold having a base with constant temperature cooling means and an insulating layer of compressible felt attached to at least a portion of the base for slowing the cooling of the parison, the mold further having a skin layer affixed to the insulating layer, the skin layer having a thermal conductivity greater than the insulating layer and the contour and surface characteristics of the finished part;

extruding a parison into the open mold;

closing the mold, pinching the bottom of the parison closed;

introducing a gas into the parison and expanding the parison against the interior of the mold, the portion of the parison in contact with the insulated skin layer not quenching thereby avoiding surface imperfections; and compressing the felt insulating layer, thereby increasing the thermal conductivity of the insulating layer to promote parison cooling.

4. A method of forming blow molded parts in a mold having a base including constant temperature cooling means, an insulating layer attached to at least a portion of the base, and a skin layer affixed to the insulating layer, the skin layer having a thermal conductivity greater than the insulating layer, said method comprising:

extruding a parison in an open mold;

closing the mold, pinching the bottom of the parison closed;

introducing a gas into the parison, expanding the parison against the interior of the mold;

opening the mold before the skin layer reaches the glass transition temperature of the resin of the part to be molded;

removing and recycling the parison;

extruding another parison in the mold while the skin layer is still hot;

closing the mold, pinching the bottom of the parison closed;

introducing gas into the parison expanding the parison against the interior of the mold, the portion of the parison contacting the skin layer not quenching thereby avoiding surface imperfections;

opening the mold; and removing the finished part.

* * * * *